United States Patent [19]

Hashiguchi

[11] Patent Number: 5,775,929
[45] Date of Patent: Jul. 7, 1998

[54] CARD CONNECTOR CAPABLE OF PREVENTING AN OBJECT AND CONTACTS FROM BEING DAMAGED

[75] Inventor: Osamu Hashiguchi, Tokyo, Japan

[73] Assignee: Japan Aviation Electronics Industry, Limited, Tokyo, Japan

[21] Appl. No.: 848,795

[22] Filed: May 1, 1997

[30] Foreign Application Priority Data

May 23, 1996 [JP] Japan .................... 8-128072

[51] Int. Cl.⁶ .................................... H01R 23/70
[52] U.S. Cl. .................... 439/260; 235/441; 439/630
[58] Field of Search ................. 439/630, 260, 439/635; 235/375, 380, 379, 441

[56] References Cited

U.S. PATENT DOCUMENTS

| 5,013,255 | 5/1991 | Juret et al. | 439/260 |
| 5,369,259 | 11/1994 | Bleier et al. | 235/441 |

FOREIGN PATENT DOCUMENTS

| 0263746 | 9/1987 | European Pat. Off. |
| 0307692 | 8/1988 | European Pat. Off. |
| 0414390 | 7/1990 | European Pat. Off. |

*Primary Examiner*—Neil Abrams
*Assistant Examiner*—T. C. Patel
*Attorney, Agent, or Firm*—Laff, Whitesel, Conte & Saret, Ltd.

[57] ABSTRACT

In a card connector for connection with a card-like object (12) having a terminal (120) on one surface thereof, a base insulator (2) has a principal surface and an inclined surface (24) brought into engagement with a first part of the object to move the first part towards the principal surface in accordance with movement of the object along the principal surface. A contact (3) is held to the base insulator and has a contacting portion (31) located above the principal surface. A cover insulator (4) is opposite the principal surface and is provided with an engaging portion (43) and a pressing portion (44). The engaging portion is brought into engagement with the object and is moved towards the principal surface together with the first part of the object in accordance with movement of the object along the principal surface. The pressing portion presses a second part of the object towards the principal surface to make the terminal be brought into contact with the contacting portion of the contact.

8 Claims, 12 Drawing Sheets

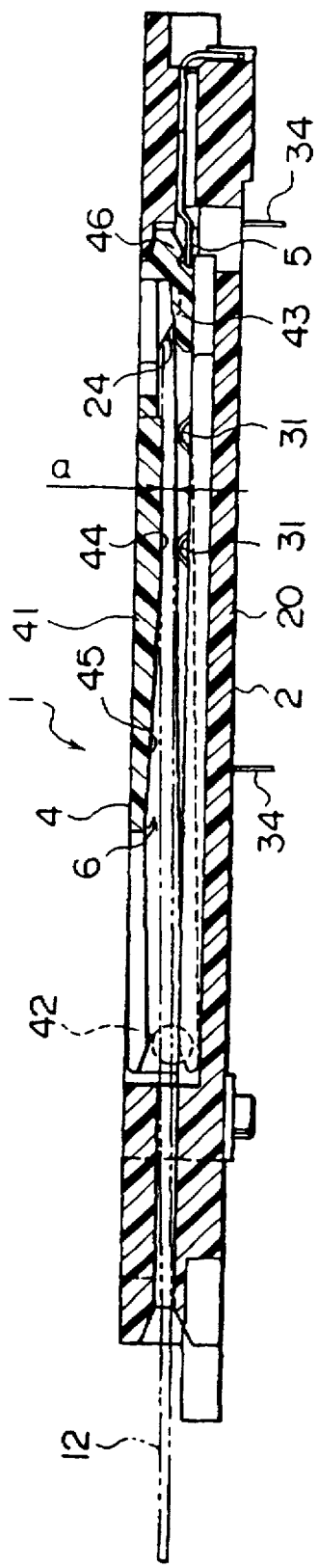
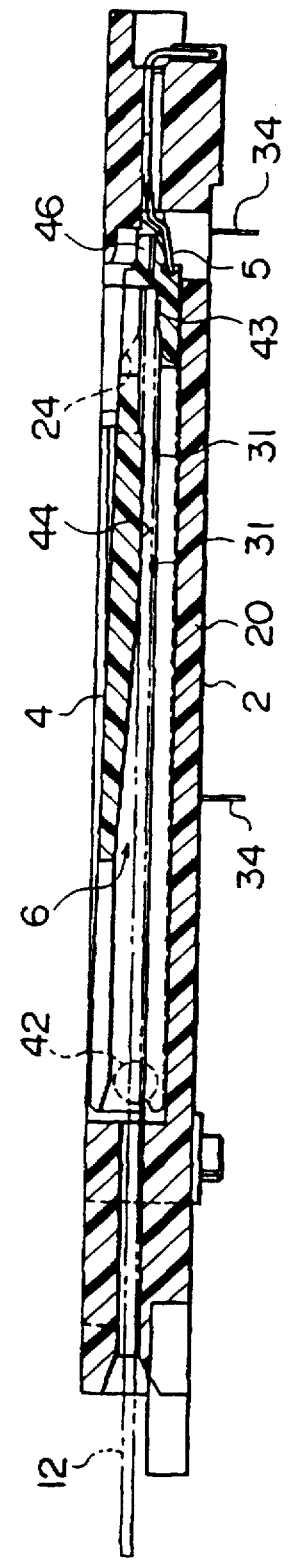
FIG. 4A
FIG. 4B

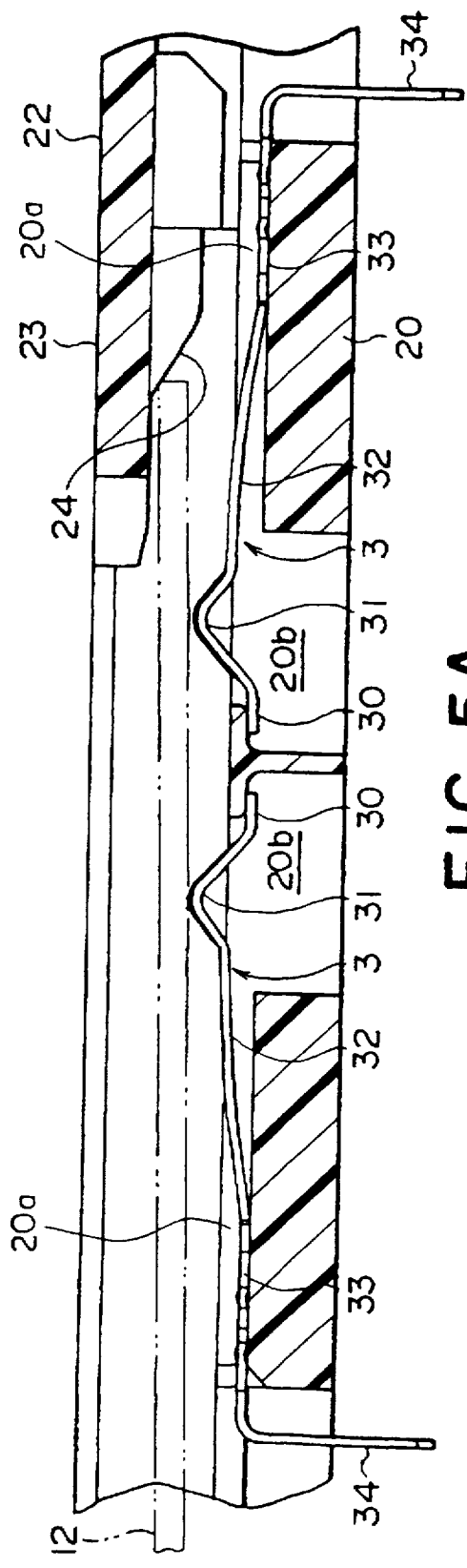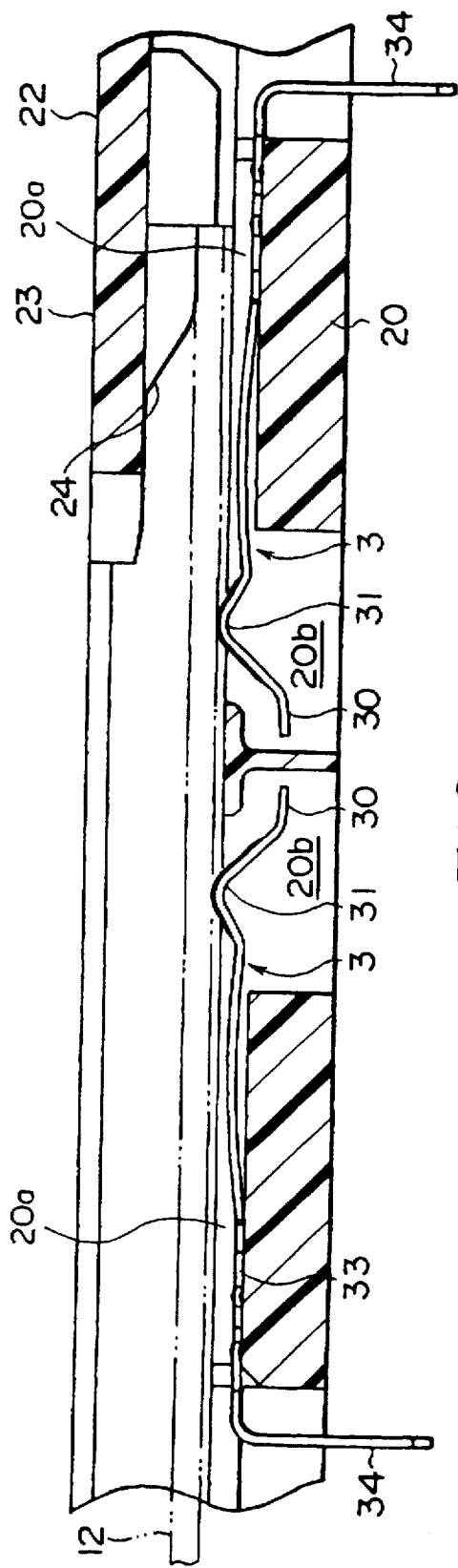

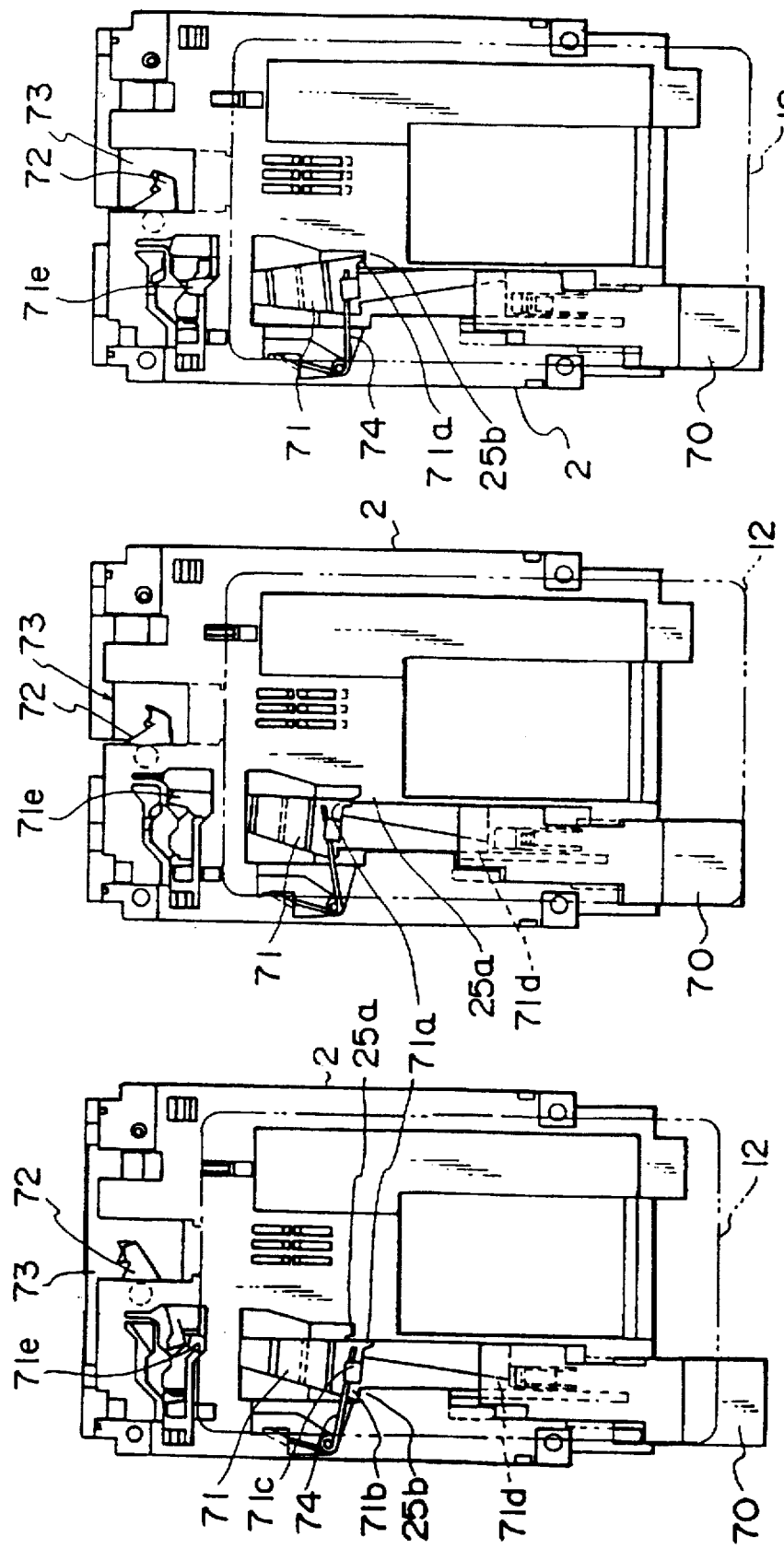

CARD CONNECTOR CAPABLE OF PREVENTING AN OBJECT AND CONTACTS FROM BEING DAMAGED

BACKGROUND OF THE INVENTION

This invention relates to a card connector for connection with a card-like object, such as an IC card known in the art.

As such a card connector, there is known a card connector disclosed in U.S. Pat. No. 5,013,255. The card connector is for connection with a card-like object having terminals formed on one end face in a thickness direction. The card connector comprises a base insulator, a plurality of contacts, and a cover insulator. Each of contacts has a contacting portion and is attached to the base insulator so that at least the contacting portion is positioned above one surface of the base insulator. The contacting portion is adapted to be brought into elastic contact with one of the terminals of the object. The cover insulator is fixedly arranged over the one surface of the base insulator to form, in cooperation with the base insulator, a receiving space for receiving the object in an orientation in which its one end face in the thickness direction confronts the one surface of the base insulator.

In the conventional card connector, the contacts are kept in sliding contact with the object until the top end of the object is abutted against the base insulator after passing over the contacting portions of the contacts. Thus, in the conventional card connector, the relative sliding distance between the contacts and the object is inevitably long. As a consequence, the contacts and the object are susceptible to damage.

When the relative sliding distance between the contacts and the object is forcedly shortened, it is necessary to increase the clearance of a supporting portion supporting the object so as to prevent the release of the object and the contacts upon connection. With this structure, when the object is heated, the object is allowed to be greatly bent towards a direction such that contacting force is weakened. Disadvantageously, this results in deterioration in reliability of connection.

In addition, in the conventional card connector, the object is supported by the bending surface upon connection. Specifically, upon connection, the object is brought into contact with the contacts in an unnaturally curved condition. In this respect also, the object is susceptible to damage.

SUMMARY OF THE INVENTION

It is therefore an object of this invention to provide a card connector which is capable of preventing an object and contacts from being damaged and achieving excellent reliability of connection.

Other objects of this invention will become clear as the description proceeds.

According to an aspect of this invention, there is provided a card connector for connection with a card-like object having a terminal on one surface thereof. The card connector comprises a base insulator having a principal surface and an inclined surface inclined to the principal surface. The inclined surface is brought into engagement with a first part of the card-like object to move the first part towards the principal surface in accordance with movement of the card-like object along the principal surface. The card connector further comprises a contact held to the base insulator and having a contacting portion located above the principal surface, and a cover insulator opposite the principal surface. The cover insulator comprises an engaging portion for being brought into engagement with the card-like object. The engaging portion is moved towards the principal surface together with the first part of the card-like object in accordance with movement of the card-like object along the principal surface. The cover insulator further comprises a pressing portion connected to the engaging portion for pressing a second part of the card-like object towards the principal surface to make the terminal be brought into contact with the contacting portion of the contact.

According to another aspect of this invention, there is provided a card connector for connection with a card-like object having a terminal formed on one end face in a thickness direction. The card connector comprises a base insulator, a contact which has a contacting portion and is attached to the base insulator so that at least the contacting portion is located above one surface of the base insulator and which is adapted to be brought into elastic contact with the terminal at the contacting portion, and a cover insulator arranged over the one surface of the base insulator and attached to the base insulator so that the card-like object is received and guided to a predetermined abutting position in an orientation in which the one end face of the card-like object confronts the one surface of the base insulator, and so that the terminal is allowed to move towards and away from the one surface of the base insulator. The base insulator has an inclined surface. The inclined surface is formed so that, while the card-like object is moved from an approaching position slightly before the abutting position to the abutting position. The inclined surface is engaged with a top end of the card-like object to press the top end towards the one surface of the base insulator until the terminal is finally pressed against the contacting portion. The cover insulator has a receiving portion and a flat surface. The receiving portion is brought into contact at least with the top end when at least the top end is engaged with the inclined surface. The flat surface is brought into contact with the other end face of the card-like object in the thickness direction at least at a portion corresponding to the terminal to thereby maintain the object in a flat condition at least when the card-like object is located at the abutting position and the terminal is kept in contact with the contacting portion.

BRIEF DESCRIPTION OF THE DRAWINGS

FIGS. 4A and 4B are sectional views taken along a line IV—IV in FIG. 3A;

FIGS. 5A and 5B are partial sectional views along a line V—V in FIG. 3A;

FIGS. 9A through 9F are views for describing an operation of an eject mechanism of the card connector illustrated in FIG. 3.

DESCRIPTION OF PREFERRED EMBODIMENT

Figure 1:
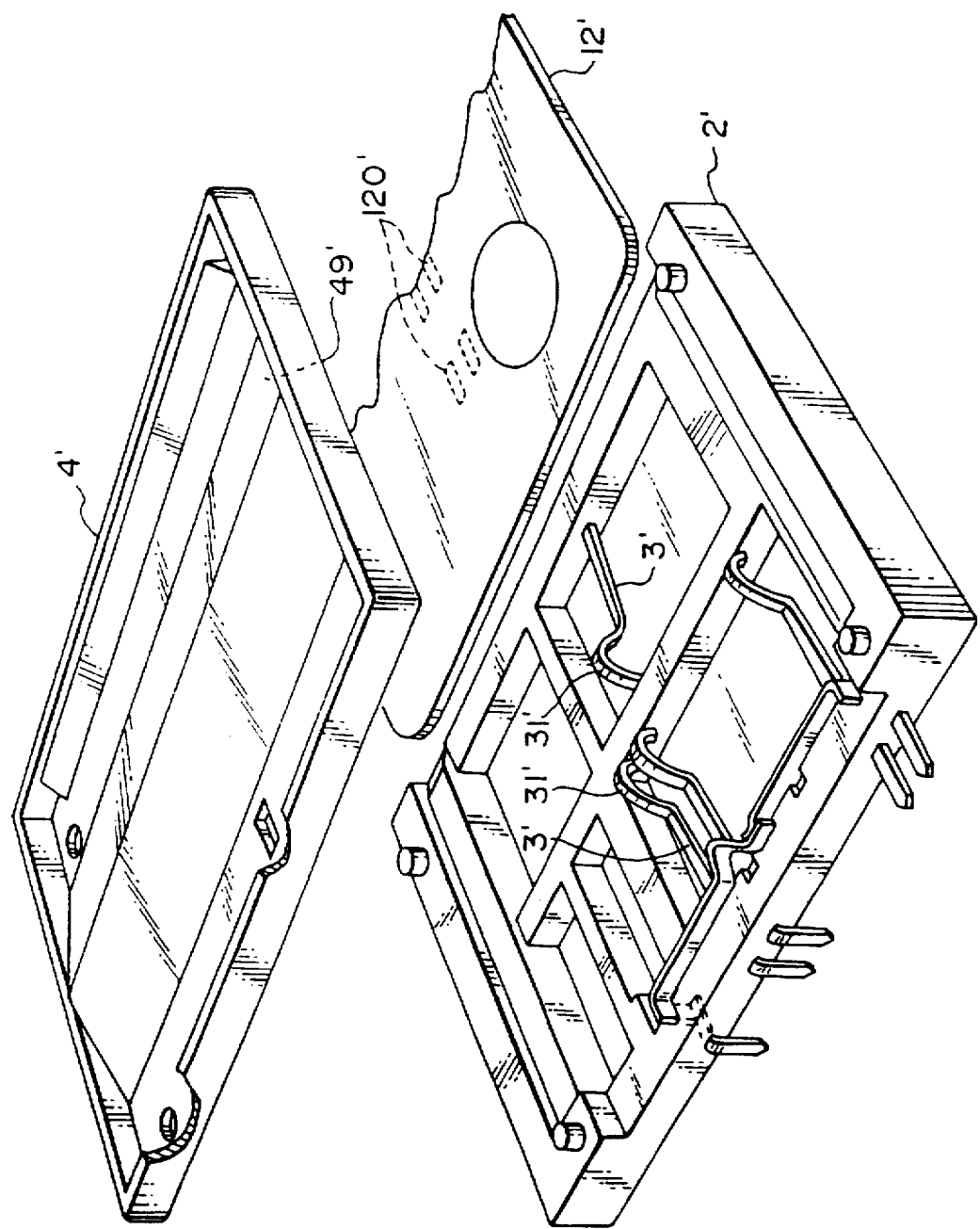
FIG. 1 is an exploded perspective view of an example of a conventional card connector.
Figure 2:
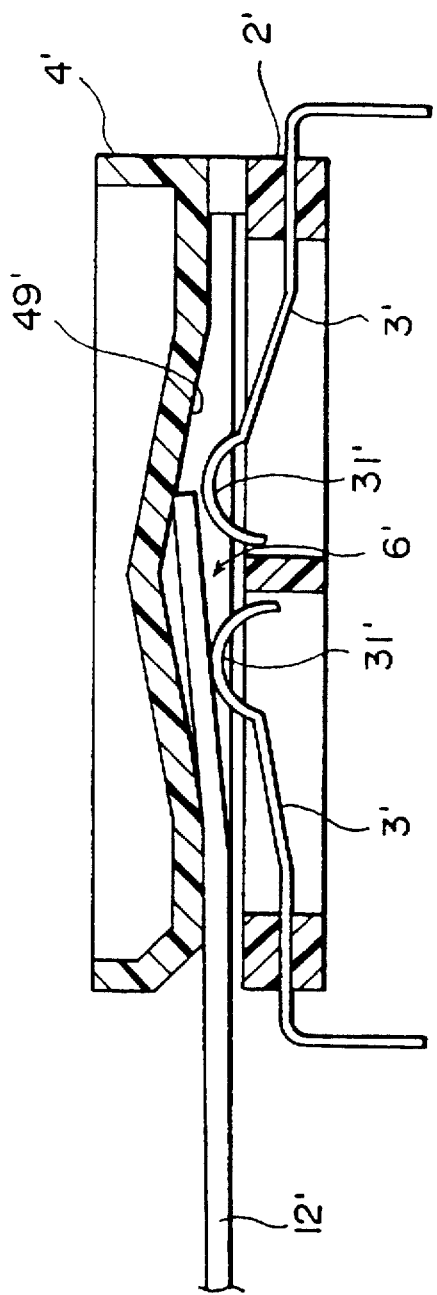
FIG. 2 is a vertical sectional view of the conventional card connector illustrated in FIG. 1.
Figure 3:
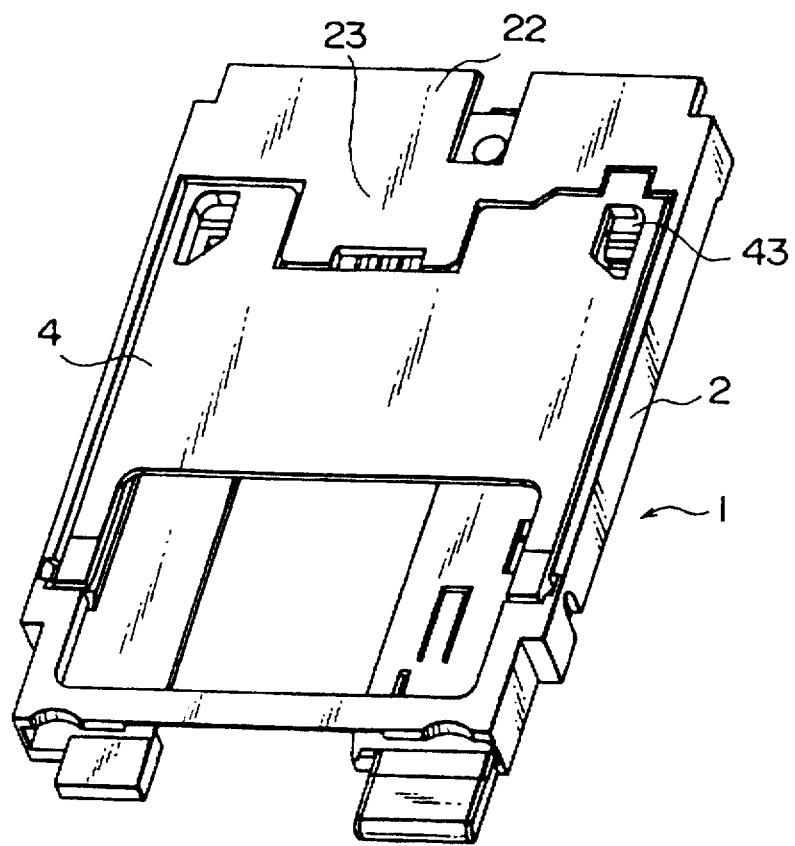
FIG. 3 is a perspective view of a card connector according to an embodiment of this invention.
Figure 3B:
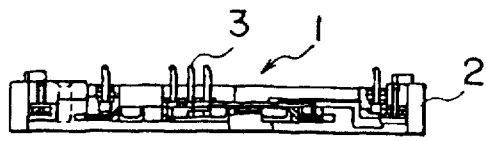
FIG. 3B is a plan view of the card connector illustrated in FIG. 3.
Figure 3A:
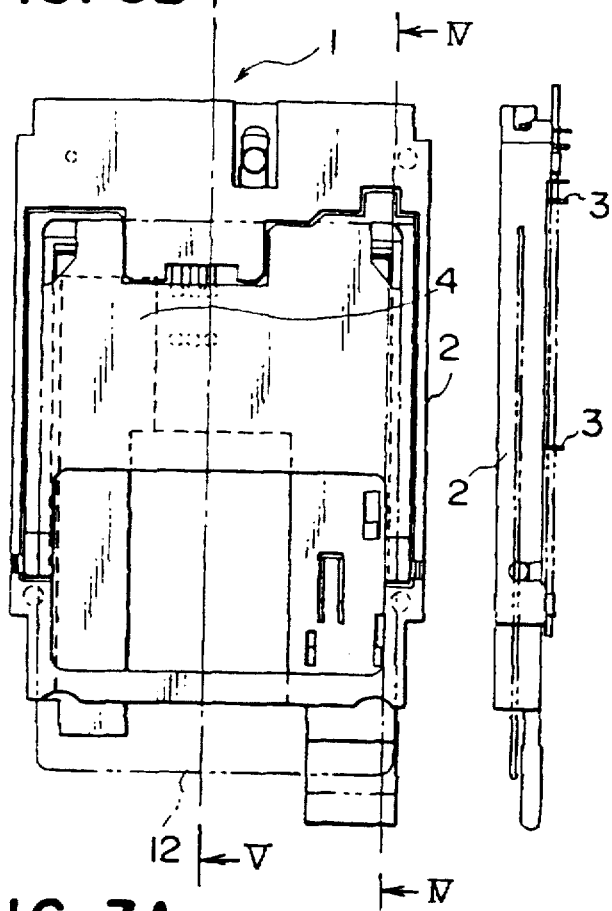
FIG. 3A is a front view of the card connector illustrated in FIG. 3.
Figures 3D, 3E:
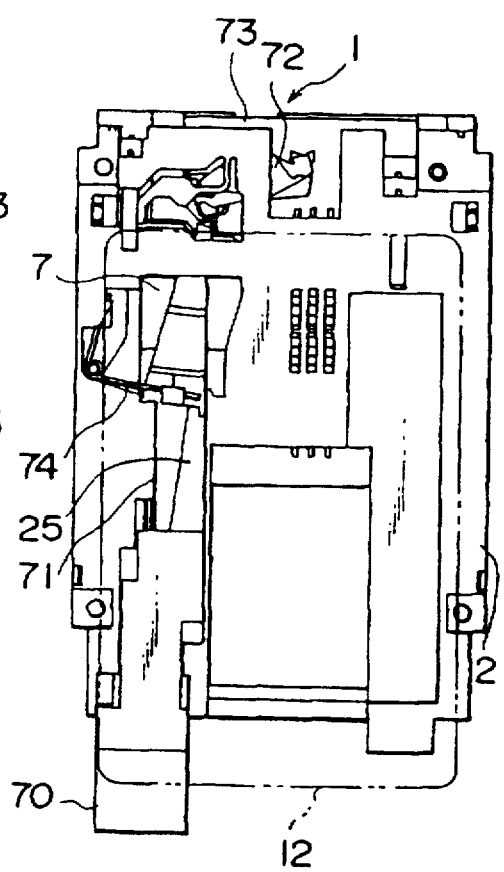
FIG. 3D is a right side view of the card connector illustrated in FIG. 3.
FIG. 3E is a rear view of the card connector illustrated in FIG. 3.
Figure 3C:
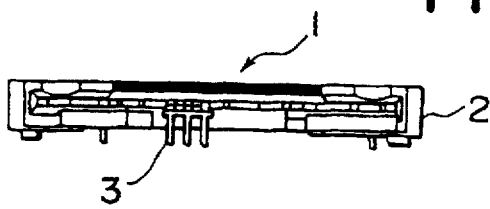
FIG. 3C is a bottom view of the card connector illustrated in FIG. 3.

For better understanding of this invention, description will be made at first as regards a conventional card connector corresponding to that is disclosed in U.S. Pat. No. 5,013,255. Referring to FIGS. 1 and 2, the card connector is for connection with a card-like object 12' having terminals 120' formed on one end face in a thickness direction. The object 12' may be an IC card known in the art.

The card connector comprises a base insulator 2', a plurality of contacts 3', and a cover insulator 4'. Each of contacts 3' has a contacting portion 31' and is attached to the base insulator 2' so that at least the contacting portion 31' is positioned above one surface of the base insulator 2'. The contacting portion 31' is adapted to be brought into elastic contact with one of the terminals 120' of the object 12'. The cover insulator 4' is fixedly arranged over the one surface of the base insulator 2' to form, in cooperation with the base insulator 2', a receiving space 6' for receiving the object 12' in an orientation in which its one end face in the thickness direction confronts the one surface of the base insulator 2'.

The cover insulator 4' has a bending surface 49'. The bending surface 49' confronts the contacting portions 31' of the contacts 3' and is bent so that its center portion is away from the contacting portions 31'. The cover insulator 4' is configured in the above-mentioned manner to weaken sliding contact force between the object 12' and the contacts 3' while the object 12' is moved to an abutting position within the receiving space 6'.

The object 12' is inserted from one end of the card connector into the receiving space 6' until its top end in an insertion direction is finally abutted to a part of the base insulator 2' to be locked at the predetermined abutting position. Thus, the terminals 120' of the object 12' are brought into contact with the contacting portions 31' of the contacts 3' to connect the object 12' and the card connector. At this time, the terminals 120' and a surrounding region are supported at their rear side by the bending surface 49' to thereby prevent the object 12' from being released from the contacts 3'.

Figure 8:
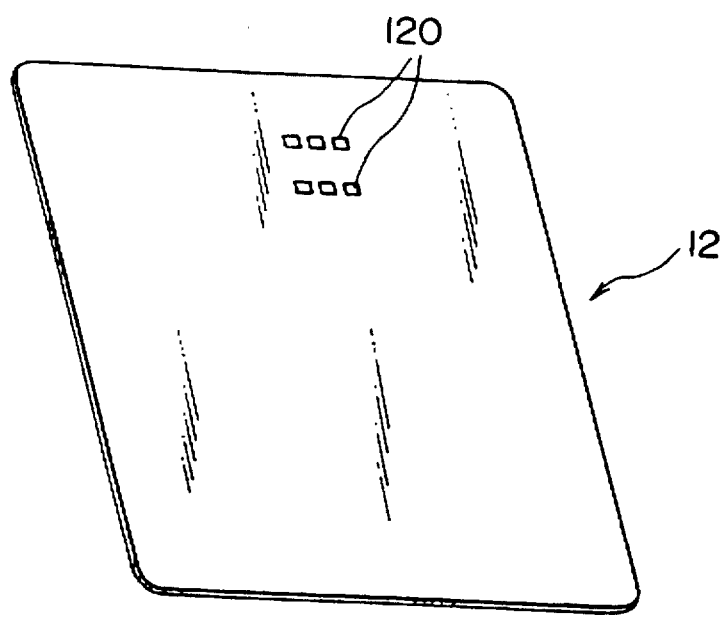
FIG. 8 is a perspective view of an IC card to be connected to the card connector illustrated in FIG. 3.

Referring to FIGS. 3, 3A through 3E, 4A, 4B, 5A, and 5B, the description will be made as regards a card connector 1 according to an embodiment of this invention. The card connector 1 is for connection with a card-like object 12 illustrated in FIG. 8 having terminals or lands 120 formed on one surface in a thickness direction thereof. As the object 12, use may be of an IC card. Therefore, the object 12 will be called hereinunder the IC card.

In the manner which will presently be described, the card connector 1 comprises a base insulator 2, contacts 3, and a cover insulator 4.

As seen from FIGS. 5A and 5B, each contact 3 has an abutting portion 30, a contacting portion 31, a spring portion 32, a fixing portion 33, and a terminal portion 34 all of which are integrally formed. The contact 3 is fixed to the base insulator 2 by press-fitting the fixing portion 33 into a contact press-fit groove 20a (FIG. 6) formed on the bottom portion 20 of the base insulator 2. To apply a preload (a preliminary load) on the contact 3, the abutting portion 30 is kept in contact with a rear side of a peripheral edge of a hole 20b formed on the bottom portion 20 of the base insulator 2, as depicted in FIG. 5A. In this condition, the contacting portion 31 of the contact 3 is positioned above a principal surface, namely, an upper surface of the bottom portion 20 of the base insulator 2. The contacting portion 31 can be retracted into the hole 20b of the base insulator 2, as depicted in FIG. 5B. The contact 3 is brought into elastic contact with a corresponding one of the terminals 120 of the IC card 12 at the contacting portion 31.

Figure 6:
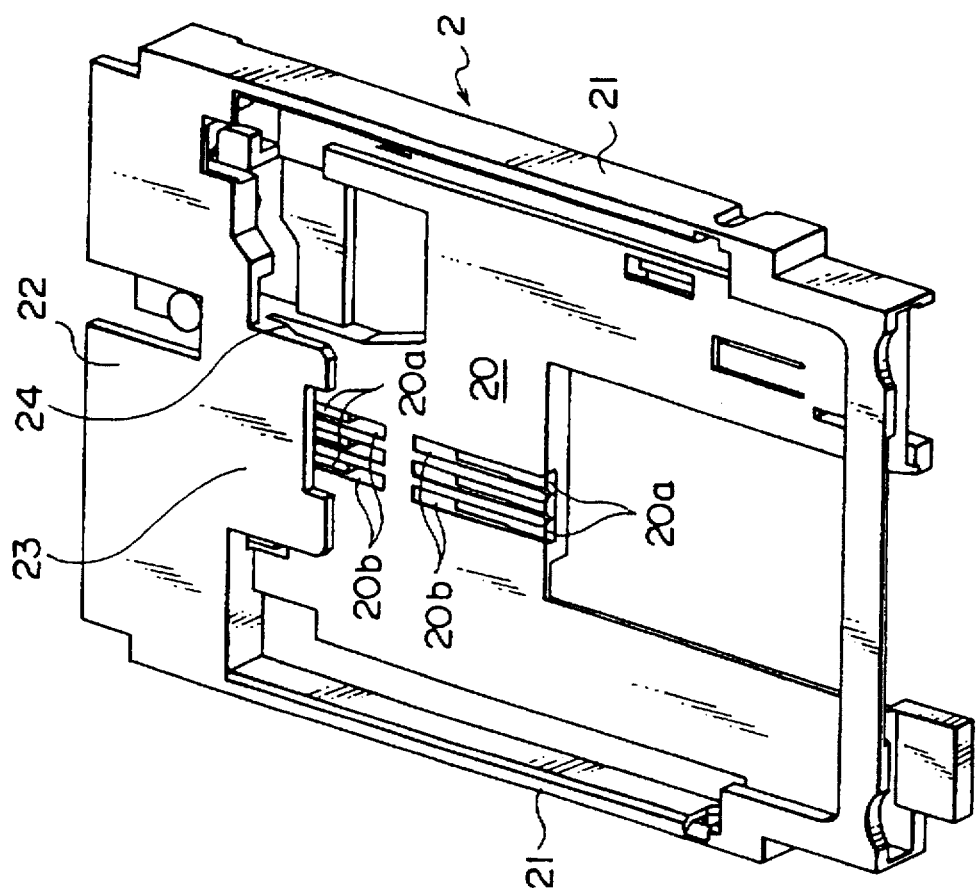
FIG. 6 is a perspective view of a base insulator of the card connector illustrated in FIG. 3.

Referring to FIG. 6 in addition to FIGS. 4A and 4B, the description will be directed to the base insulator 2. The base insulator 2 is formed into a generally frame-like shape and has a bottom portion 20, side wall portions 21 continuous to both side edges thereof, and a ceiling portion 22 bridged between the side wall portions 21 on their one ends in an insertion direction of the IC card 12 and confronting the bottom portion 20.

The base insulator 2 is provided with a protruding portion 23 formed at the center of the ceiling portion 22. The protruding portion 23 has an inclined surface 24 formed at the side faced to the bottom portion 20. The inclined surface 24 is formed so that, while the IC card 12 is moved from an approaching position slightly before the abutting position to the abutting position, the inclined surface 24 is engaged with a forward top end of the IC card 12 to press the top end of the IC card 12 towards the upper surface of the bottom portion 20 of the base insulator 2 until the terminals of the IC card 12 are finally pressed against the contacts 3.

With the engagement between the inclined surface 24 and the IC card 12, the cover insulator 4 is also rotated around shaft portions 42 which will later become clear.

The base insulator 2 is provided with return springs 5 arranged in both side portions of the one end of the base insulator 2 to serve as urging members for the cover insulator 4.

Figure 7A:
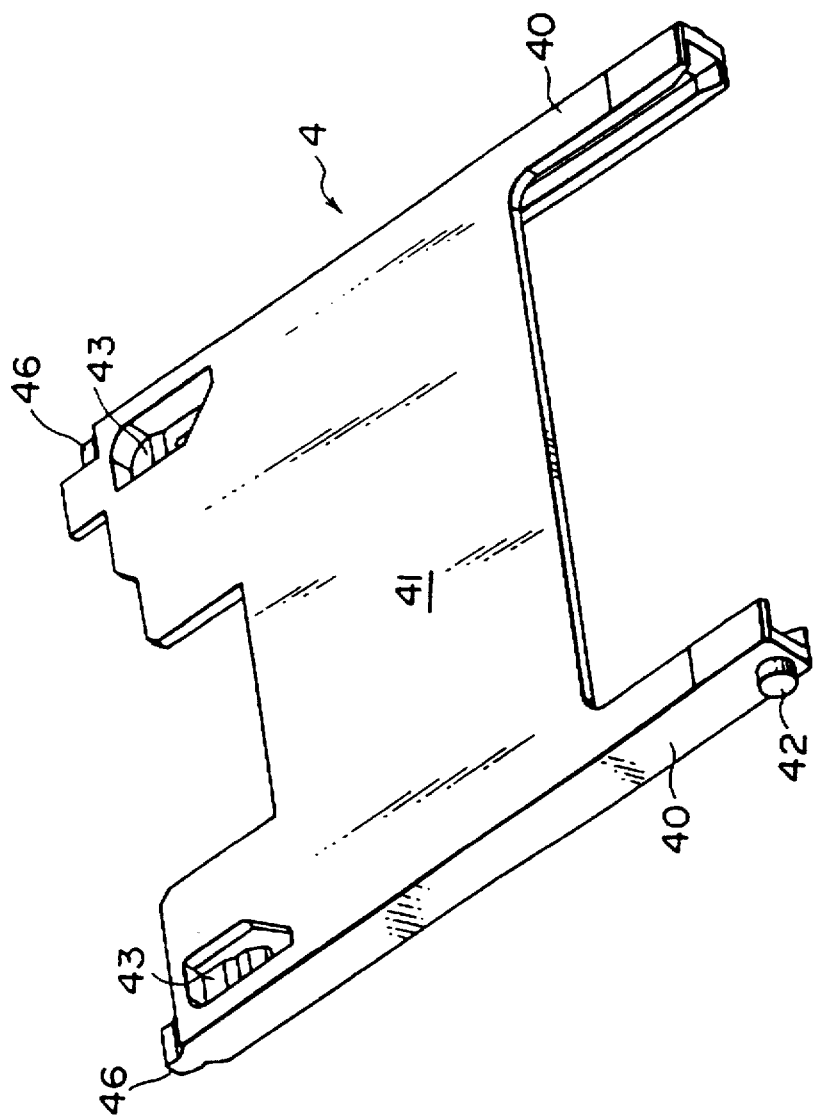
FIG. 7A is a perspective view of a cover insulator of the card connector illustrated in FIG. 3 as seen from the above.
Figure 7B:
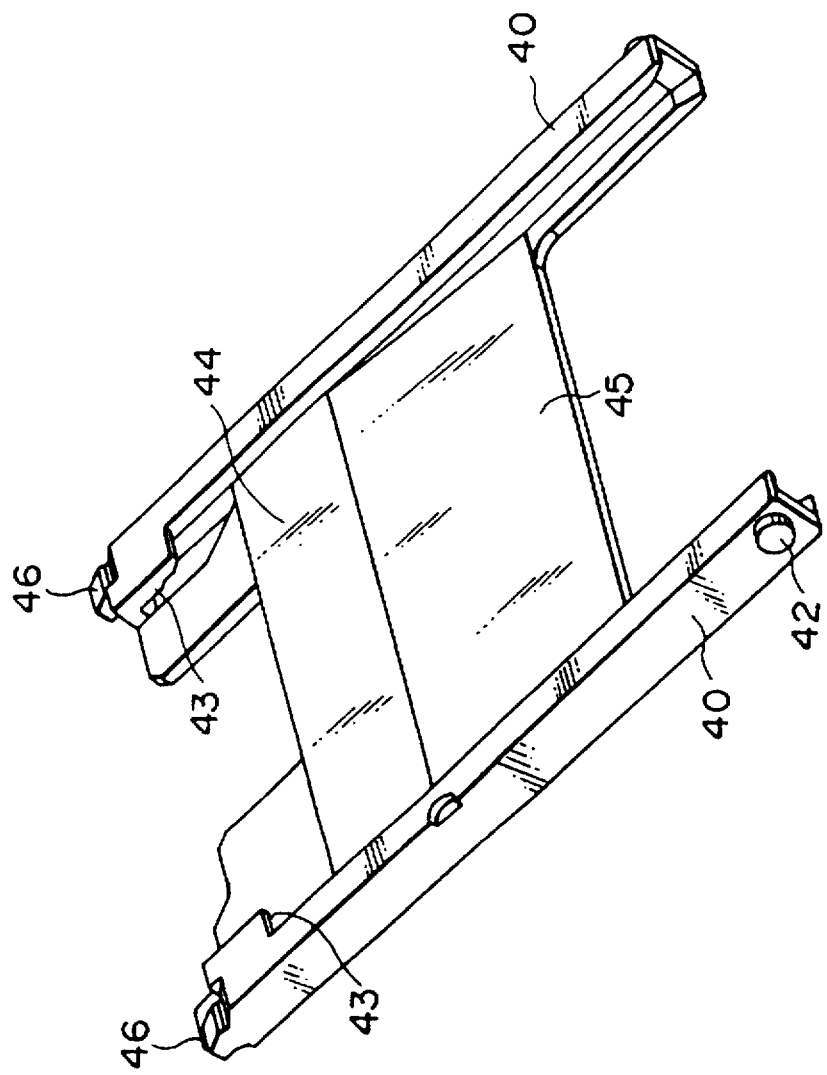
FIG. 7B is a perspective view of the cover insulator of the card connector illustrated in FIG. 3 as seen from the below.

Referring to FIGS. 7A and 7B in addition to FIGS. 4A and 4B, the description will be directed to the cover insulator 4. The cover insulator 4 has a generally frame-like shape and comprises a pair of guide portions 40 and a ceiling portion 41 coupling the pair of guide portions 40. The cover insulator 4 is located over the upper surface of the bottom portion 20 of the base insulator 2 and is adapted to receive the IC card 12 by the guide portions 40 and to guide it to a predetermined abutting position in an orientation in which the surface of the IC card 12 provided with the terminals confronts the upper surface of the bottom portion 20 of the base insulator 2. Herein, the abutting position is defined as a position where the object is abutted against a portion of the base insulator and/or the cover insulator to be inhibited from movement.

The guide portions 40 are provided with the shaft portions 42 formed at card insertion ends thereof. The shaft portions 42 are rotatably supported on the side wall portions 21 of the base insulator 2. Thus, the cover insulator 4 is rotatably coupled to the base insulator 2 so that the one end face of the IC card 12 in the thickness direction that is held by the base insulator 2 can move towards and away from the upper surface of the bottom portion 20 of the base insulator 2.

The cover insulator 4 further comprises a pair of receiving portions 43, a flat surface 44, an inclined surface 45, and a pair of protrusions 46. The receiving portions 43 are arranged inside of the top ends of the pair of guide portions 40, respectively. The flat surface 44 and the inclined surface 45 are formed on the ceiling portion 41 at the side faced to the base insulator 2. The receiving portions 43 receive first parts, namely, the both side edges of the top end of the IC card 12 and are brought into sliding contact with that portion at the side faced to the contacts when the top end of the IC card 12 is engaged with the inclined surface 24 of the base insulator 12. When the top end of the IC card 12 is rotated towards the contacts 3 as a result of the sliding contact, the cover insulator 4 is pressed at the receiving portions 43 by the IC card 12 to be rotated towards the contacts 3. The receiving portions 43 also serve as engaging portions for the IC card 12.

Between the time instant when the top end of the IC card 12 is brought into contact with the inclined surface 24 and the time instant when the IC card 12 reaches the abutting position to bring the terminals 120 of the IC card 12 into contact with the contacting portions 31 of the contacts 3, and while the terminals 120 are kept in contact with the contacting portions 31, the flat surface 44 is brought into contact with the other end face (opposite to the surface provided with the terminals) of the IC card 12 in the thickness direction at a second part of the IC card 12 corresponding to the terminals and the peripheral portion thereof to keep the IC card 12 in a flat condition. The flat surface 44 is referred to as a pressing portion.

The inclined surface 45 serves to expand an IC card receiving space 6 defined between the ceiling portion 41 and the bottom portion 2 of the base insulator 2 towards a receiving side for the IC card 12. Thus, the IC card 12 is readily inserted into the IC card receiving space 6.

The protrusions 46 are continuous to the top ends of the guide portions 40. These protrusions 46 are engaged with the return springs 5. The cover insulator 4 is urged by the return springs 5 in a direction in which the terminals of the IC card 12 received therein are away from the upper surface of the bottom portion 20 of the base insulator 2.

In the card connector 1, when the IC card 12 is inserted into the cover insulator 4, the IC card 12 is guided by the cover insulator 4 to the predetermined abutting position. At this time, the IC card 12 is guided in the orientation in which the principal surface of the IC card 12 confronts the one surface of the base insulator 2. The IC card 12 is not brought into contact with any portion other than the cover insulator 4 until it reaches the approaching position slightly before the abutting position. When the IC card 12 reaches the approaching position slightly before the abutting position, the top end of the IC card 12 in a forward direction is brought into contact with the inclined surface of the base insulator 2. When the IC card 12 is further moved forward from that position, the top end of the IC card 12 is pressed by the inclined surface. This brings about the rotation of the cover insulator 4 towards the base insulator 2. The above-mentioned state is continued until the IC card 12 reaches a proximate position immediately before the abutting position. At this stage, the terminals of the IC card 12 are not yet brought into contact with the contacts 3. When the IC card 12 reaches the proximate position immediately before the abutting position, the terminals formed on the principal surface of the IC card 12 are first brought into contact with the contacting portions of the contacts 3. When the IC card 12 is moved from that position to the abutting position, the inclined surface further presses the top end of the IC card 12 object. As a result, the terminals of the IC card 12 and the contacting portions of the contacts 3 are brought into press contact to thereby connect the IC card 12 and the card connector 1.

As described above, the contacting portions 31 of the contacts 3 are kept in sliding contact with the IC card 12 only while the IC card 12 is moved from the proximate position immediately before the abutting position to the abutting position. Accordingly, the relative sliding distance between the contacts 3 and the IC card 12 is short.

As described above, when the IC card 12 is inserted into the cover insulator 4 and the top end of the IC card 12 is moved by the inclined surface of the base insulator 2 towards the contacts 3, at least the top end of the IC card 12 is brought into contact with the receiving portion of the cover insulator 4 at the side opposite to the inclined surface. Accordingly, the cover insulator 4 is pressed by the IC card 12 so that the cover insulator 4 is rotated towards the contacts 3. During this rotation, the flat surface formed on the cover insulator 4 is also rotated in contact with the IC card 12. Accordingly, not only the top end of the IC card 12 but also a whole of the IC card 12 are pressed against the contacts 3 in a flat condition.

In the card connector 1, the flat surface formed on the cover insulator 4 is brought into contact with the other end face of the IC card 12 in the thickness direction at least at a portion corresponding to the terminals at least when the IC card 12 is located at the abutting position. Thus, the IC card 12 is kept in the flat condition. Accordingly, when the terminals of the IC card 12 and the contacting portions 31 of the contacts 3 are kept in contact, namely, when the IC card 12 and the card connector 1 are connected, the the IC card 12 is prevented from being curved.

Referring to FIGS. 9A through 9F, the card connector 1 is provided with an eject mechanism 7 for releasing the IC card 12 connected thereto. In the manner which will presently be described, the eject mechanism 7 has an eject button 70, an actuator 71, a release lever 72, a release plate 73, and a spring 74.

The eject button 70 is formed on the base insulator 2 and arranged in a groove 25 extending in a coupling/releasing direction of the IC card 12 to be movable in the coupling/releasing direction. The actuator 71 is slidably arranged in the groove 25 of the base insulator 2 with its one end kept in contact with an abutting surface 70a of the eject button 70. The actuator 71 has a generally sagittate shape and is provided with shoulder portions 71a and 71b formed at its intermediate portion. The release lever 72 is rotatably arranged at one end of the base insulator 2. The release lever 72 has one end brought into contact with the other end of the actuator 71. The other end of the release lever 72 is coupled to the release plate 73. The release lever 72 is urged so that the release plate 73 is moved backward (upward in FIGS. 9A through 9F). The release plate 73 is located at the one end of the base insulator 2 to be slidable in the coupling/releasing direction. The spring 74 is arranged in the base insulator 2 and has one end fixed to the base insulator 2 and the other end engaged with a protrusion 71c formed at the center of the actuator 71 to urge the actuator 71 towards the eject button 70.

Side walls defining the groove 25 of the base insulator 2 have step portions 25a and 25b for engagement with the shoulder portions 71a and 71b, respectively, to thereby lock the actuator 71. The step portions 25a and 25b are located at positions shifted from each other in the coupling/releasing direction of the IC card 12.

The one end of the actuator 71 at the side of the eject button forms an abutting portion 71d for the eject button 70. The other end of the actuator 71 at the side of the release lever forms an abutting portion 71e for the release lever 72.

With the above-mentioned structure, a pushing operation of the eject button 70 causes the actuator 71 to be pressed at its abutting portion 71d by the eject button 70. At every pushing operation, an engagement between the shoulder portion 71a of the actuator 71 and the step portion 25a and another engagement between the shoulder portion 71b of the actuator 71 and the step portion 25b are alternately carried out. By the alternate engagements, the actuator 71 swings leftward and rightward (perpendicular to the coupling/releasing direction and parallel to the one surface of the bottom portion 20). Following the swinging movement, rotation moment is produced in the actuator 71 so that the abutting portion 71e of the actuator 71 is moved leftward and rightward. As a result, the abutting portion 71e of the actuator 71 is abutted to and released from the release lever 72. As a consequence, the release plate 73 is slid in the coupling/releasing direction.

Figure 9C:
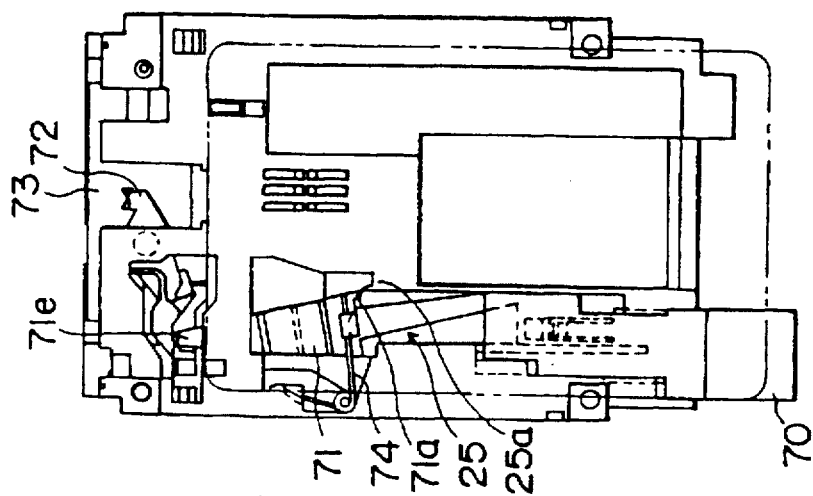
Figure 9B:
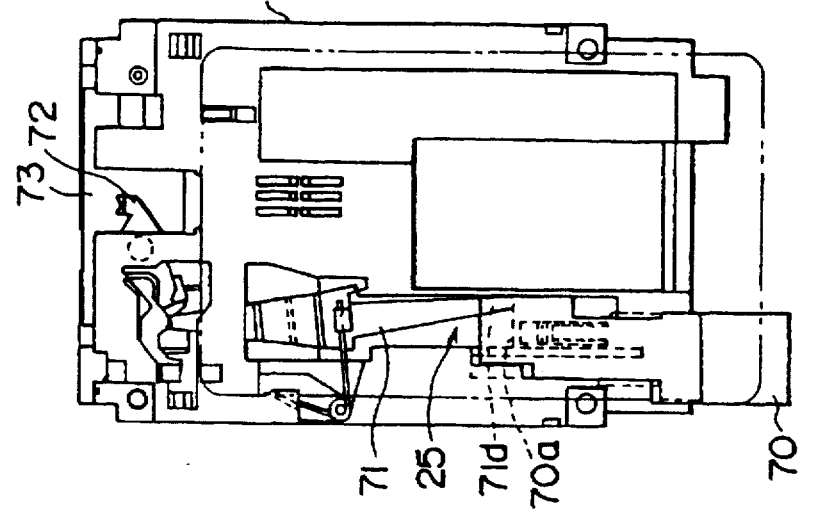
Figure 9A:
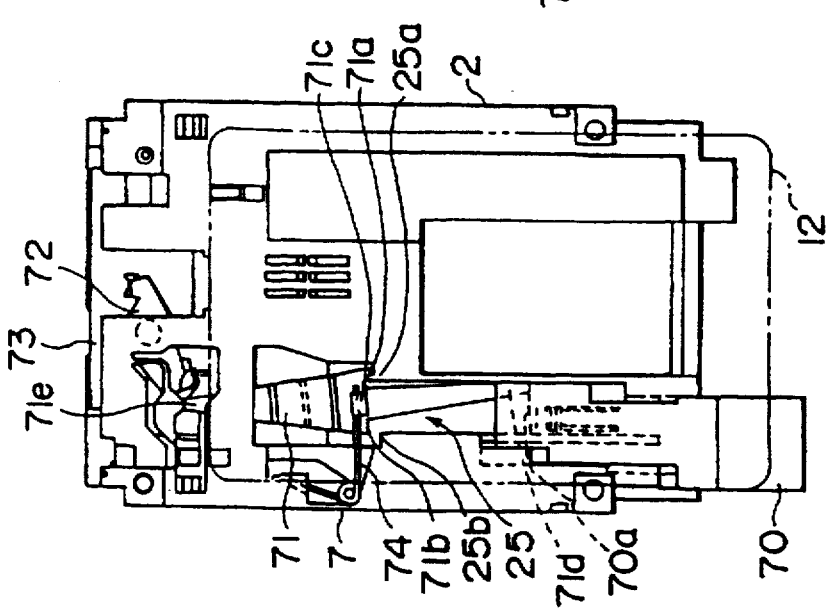

Specifically, when the shoulder portion 71a and the step portion 25a are engaged as illustrated in FIG. 9A, the abutting portion 71e of the actuator 70 is located lefthand in the figure and the engagement between the actuator 71 and the release lever 72 is released. When the eject button 70 is pressed in this state, the engagement between the shoulder portion 71a and the step portion 25a is released as illustrated in FIG. 9B. As illustrated in FIG. 9C, the shoulder portion 71a is moved out of the step portion 25a. The actuator 70 is moved towards the left side of the groove 25 in the figure by the moment produced by the spring 74 around the abutting portion 71e. When the eject button 70 is released in this state, the shoulder portion 71b and the step portion 25b are engaged as illustrated in FIG. 9D. By the moment produced by the spring 74 around the shoulder portion 71b, the abutting portion 71e of the actuator 71 is moved towards the right side in the figure so that the actuator 71 and the release lever 72 are engaged. When the eject button 70 is pressed in this state, the release lever 72 is pressed by the actuator 71 to be rotated, as illustrated in FIG. 9E. By this rotation, the release plate 73 coupled to the release lever 72 is slid in the direction of releasing the IC card 12. As a result, the IC card 12 is ejected. When the eject button 70 is released in this state, the shoulder portion 71a and the step portion 25a are engaged as illustrated in FIG. 9F. By the moment produced by the spring 74 around the shoulder portion 71a, the abutting portion 71e of the actuator 71 is moved leftward in the figure to release the engagement between the actuator 71 and the release lever 72. The release lever 71 is rotated by its urging force in a counterclockwise direction in the figure. Following this rotation, the release plate 72 is moved rearward to return to the state in FIG. 9A.

The card connector 1 is capable of making the relative sliding distance between the contacts and the object extremely short. It is therefore possible to prevent the contacts 3 and the IC card 12 from being damaged.

When the card connector 1 is connected to the IC card 12, the IC card 12 kept in a flat condition is brought into contact with the contacts 3. In this respect also, it is possible to prevent the IC card 12 from being damaged.

While this invention has thus been described in conjunction with a few embodiments thereof, it will readily be possible for those skilled in the art to put this invention into practice in various other manners. For example, each of the abutting portions for the object may be formed on the base insulator although it is formed on the cover insulator in the above description. Alternatively, each of the abutting portion may be formed on both of the base insulator and the cover insulator.

What is claimed is:

1. A card connector for connection with a card-like object having a terminal on one surface thereof, said card connector comprising:
    a base insulator having a principal surface and an inclined surface inclined to said principal surface, said inclined surface being brought into engagement with a first part of said card-like object to move said first part towards said principal surface in accordance with movement of said card-like object along said principal surface;
    a contact held to said base insulator and having a contacting portion located above said principal surface; and
    a cover insulator opposite said principal surface;
    said cover insulator comprising:
    an engaging portion for being brought into engagement with said card-like object, said engaging portion being moved towards said principal surface together with said first part of the card-like object in accordance with movement of said card-like object along said principal surface; and
    a pressing portion connected to said engaging portion for pressing a second part of said card-like object towards said principal surface to make said terminal be brought into contact with said contacting portion of the contact.

2. A card connector as claimed in claim 1, further comprising an urging member connected between said base insulator and said cover insulator for urging said cover insulator to separate said base insulator and said cover insulator to each other.

3. A card connector as claimed in claim 2, wherein said cover insulator has a first and a second end portion which are opposite each other in a direction of movement of said card-like object, said said first end portion being pivoted to said base insulator, said second end portion being urged by said urging member to separate from said base insulator.

4. A card connector as claimed in any one of claims 1 through 3, further comprising an eject mechanism for ejecting said card-like object from said card connector.

5. A card connector for connection with a card-like object having a terminal formed on one end face in a thickness direction, said card connector comprising:
    a base insulator;
    a contact which has a contacting portion and is attached to said base insulator so that at least said contacting portion is located above one surface of said base insulator and which is adapted to be brought into elastic contact with said terminal at said contacting portion; and
    a cover insulator arranged over the one surface of said base insulator and attached to said base insulator so that said card-like object is received and guided to a predetermined abutting position in an orientation in which the one end face of said card-like object confronts the one surface of said base insulator, and so that said terminal is allowed to move towards and away from the one surface of said base insulator;
    said base insulator having an inclined surface, said inclined surface being formed so that, while said card-like object is moved from an approaching position slightly before said abutting position to said abutting position, said inclined surface is engaged with a top end of said card-like object to press said top end towards the one surface of said base insulator until said terminal is finally pressed against said contacting portion;
    said cover insulator having a receiving portion and a flat surface, said receiving portion being brought into contact at least with said top end when at least said top end is engaged with said inclined surface, said flat surface being brought into contact with the other end face of said card-like object in the thickness direction at least at a portion corresponding to said terminal to thereby maintain said object in a flat condition at least when said card-like object is located at said abutting position and said terminal is kept in contact with said contacting portion.

6. A card connector as claimed in claim 5, further comprising an urging member for urging said cover insulator in a direction in which said terminal of said card-like object received in said cover insulator is moved away from the one surface of said base insulator.

7. A card connector as claimed in claim 5, wherein said receiving portion also serves as an abutting portion for locking said card-like object at said abutting position.

8. A card connector as claimed in any one of claims 5 through 7, further comprising an eject mechanism for ejecting said card-like object held by said cover insulator.

* * * * *